(12) United States Patent
Youk

(10) Patent No.: US 6,848,554 B2
(45) Date of Patent: Feb. 1, 2005

(54) SYNCHRONIZER FOR A MANUAL TRANSMISSION

(75) Inventor: Young-Chan Youk, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 45 days.

(21) Appl. No.: 10/329,239

(22) Filed: Dec. 23, 2002

(65) Prior Publication Data

US 2004/0040814 A1 Mar. 4, 2004

(30) Foreign Application Priority Data

Sep. 2, 2002 (KR) .......................... 2002-52496

(51) Int. Cl.[7] .............................................. F16D 23/06
(52) U.S. Cl. ............................. 192/53.365; 192/53.32; 74/339
(58) Field of Search ........................ 74/339; 192/53.32, 192/53.34, 53.362, 53.3, 53.341

(56) References Cited

U.S. PATENT DOCUMENTS

| | | | |
|---|---|---|---|
| 4,378,710 A | | 4/1983 | Knödel |
| 4,526,052 A | * | 7/1985 | Hiraiwa ........................ 74/339 |
| 4,613,024 A | * | 9/1986 | Irikura et al. .............. 192/18 A |
| 4,660,707 A | | 4/1987 | Sadanori et al. |
| 4,809,832 A | | 3/1989 | Inui |
| 4,830,159 A | * | 5/1989 | Johnson et al. .......... 192/53.32 |
| 4,852,709 A | | 8/1989 | Fukuhara et al. |
| 4,869,353 A | | 9/1989 | Ohtsuki et al. |
| 4,875,566 A | | 10/1989 | Inui et al. |
| 5,638,930 A | | 6/1997 | Parsons |
| 5,678,670 A | * | 10/1997 | Olsson .................... 192/53.32 |
| 5,695,033 A | | 12/1997 | Hiraiwa |
| 5,701,984 A | | 12/1997 | Park |
| 6,053,294 A | * | 4/2000 | Olsson .................... 192/53.31 |
| 6,244,404 B1 | | 6/2001 | Kim |
| 6,427,818 B1 | * | 8/2002 | Borg ........................ 192/53.32 |

* cited by examiner

*Primary Examiner*—Saul Rodriguez
(74) *Attorney, Agent, or Firm*—Morgan Lewis & Bockius LLP

(57) ABSTRACT

The synchronizer for a manual transmission ensures a spline-aligned during the coupling of the sleeve to the clutch gear. This prevents collision between the sleeve and the clutch gear and improves shifting motion.

16 Claims, 8 Drawing Sheets

SYNCHRONIZER FOR A MANUAL TRANSMISSION

FIELD OF THE INVENTION

The present invention relates to a manual transmission, and more particularly, to a synchronizer for a manual transmission, in which the synchronizing action is carried out smoothly.

BACKGROUND OF THE INVENTION

Synchronizers are used to synchronize the speeds of a sleeve and a clutch gear before their corresponding teeth engage, to avoid double clutching. Conventional synchronizers include a sleeve, a synchronizer ring, and a clutch gear. When a driver shifts into a gear, the synchronizer sleeve is moved toward the gear. As it moves, the small teeth on the sleeve engage the teeth on the synchronizer ring, causing the synchronizer ring to rotate at the same rate as the synchronizer assembly, which are splined to each other as well as the output shaft. As sleeve continues to move toward the gear, the inside of the synchronizer ring is pressed up against the conical shaped part of the gear. This causes the gear to match speed with the synchronizer, and once the speeds are matched, the synchronizer sleeve continues to slide toward the clutch gear, engaging the teeth on the side of the gear.

However, spline alignment of a sleeve and a clutch gear of conventional synchronizers cannot be ensured. Further, the speed difference between the sleeve and the clutch gear due to a break down of presynchronization causes the sleeve and the clutch gear to collide with one another. Accordingly, such a collision causes noise and motion during shifting. This noise and motion are both heard and felt by the driver, which is highly undesirable. Accordingly, a synchronizer that reduces such noise and motion would be highly desireable.

SUMMARY OF THE INVENTION

The present invention provides a synchronizer for a manual transmission, in which a spline-aligned state is ensured in advance during the coupling of the sleeve to the clutch gear to prevent collision between the sleeve and the clutch gear, and improve the shifting motion felt by the driver.

In accordance with an embodiment of the present invention, the synchronizer of a manual transmission includes a lever installed on a synchronizer ring, which revolve together in a unitized manner so as to move in a radial direction in accordance with axial movements of a sleeve. The synchronizer also includes an aligning spline formed between the lever and clutch gear so as to be coupled and decoupled in accordance with radial movements of the lever.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF THE INVENTION

Figure 1:
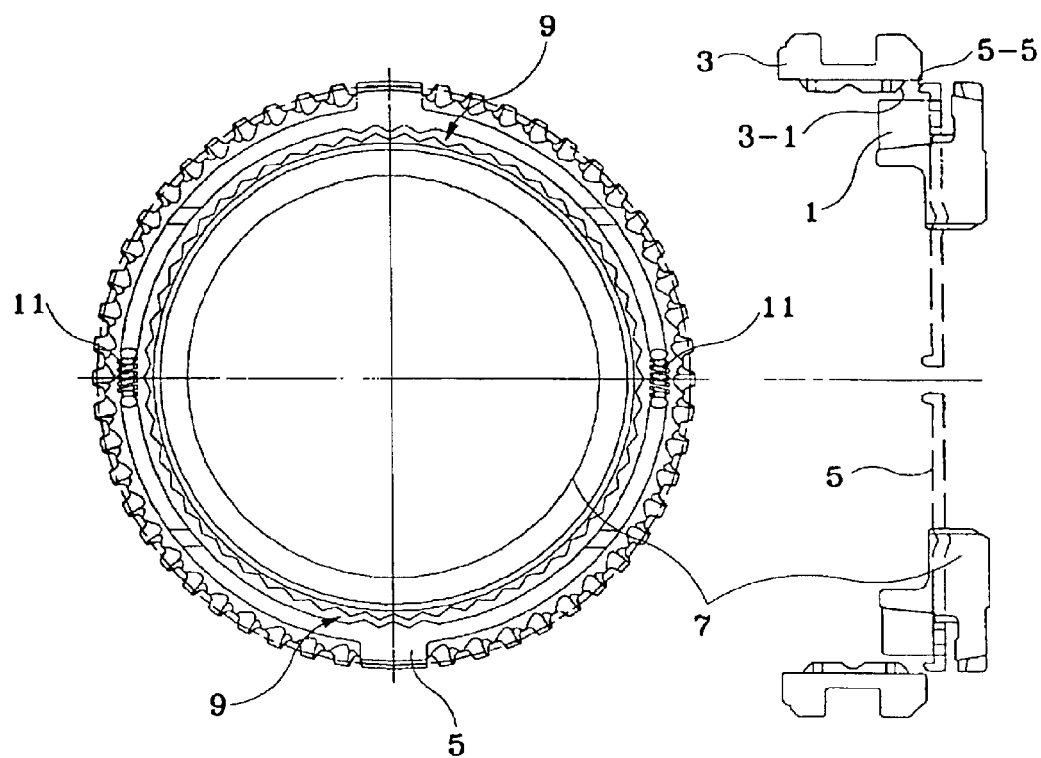
FIG. 1 illustrates a synchronizer according to the present invention.
Figure 2:
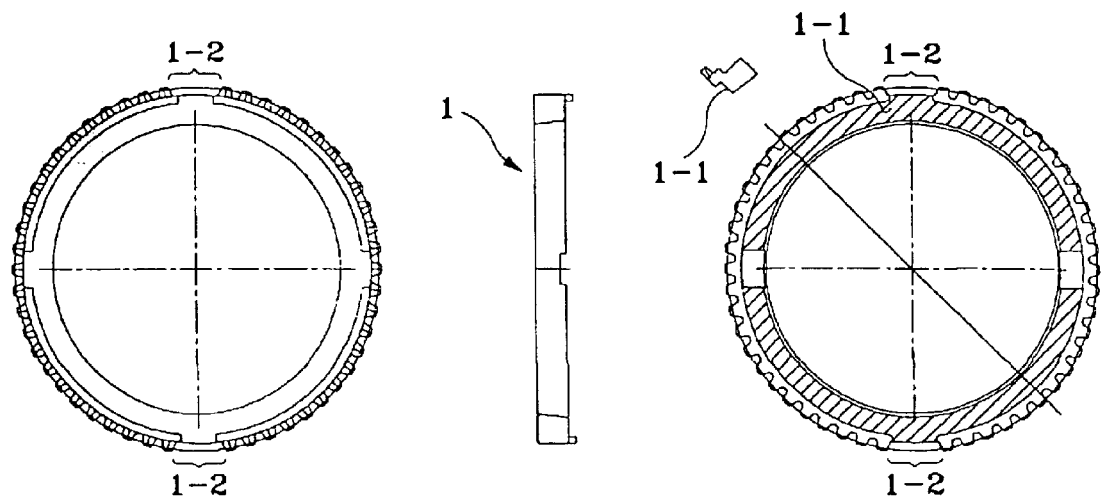
FIG. 2 illustrates a synchronizer ring of FIG. 1.

Referring to the Figures, an embodiment of a synchronizer of a manual transmission according to the present invention preferably includes a lever 5 installed on a synchronizer ring 1, both of which revolve together in a unitized manner so as to move in a radial direction in accordance with the axial movements of a sleeve 3. The synchronizer also includes an aligning spline 9 formed between the lever 5 and a clutch gear 7 so as to be coupled and decoupled in accordance with radial movements of the lever 5.

The lever 5 is preferably divided into two or more angular pieces. The divided pieces are preferably connected with springs.

Figure 3:
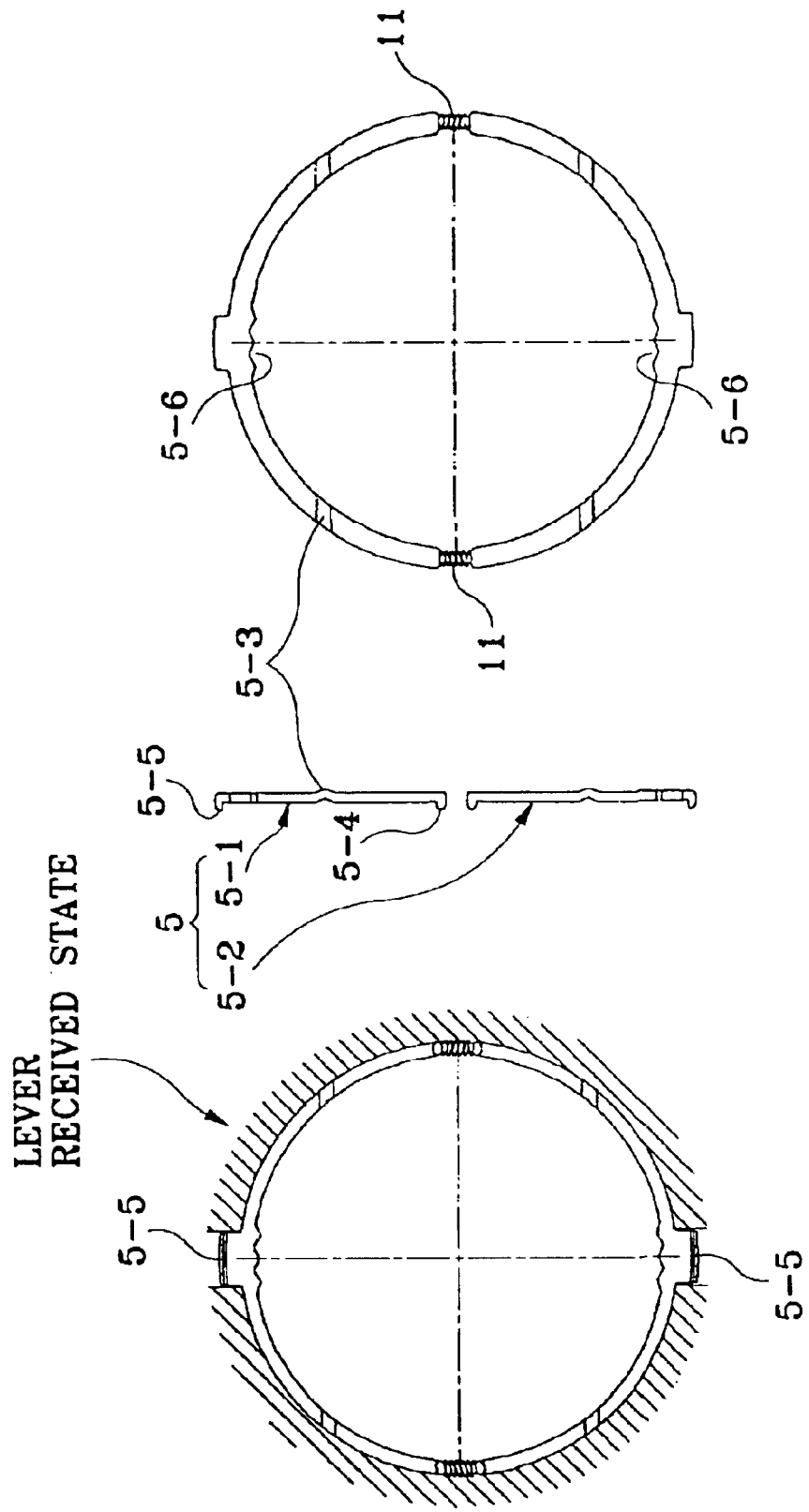
FIG. 3 illustrates a lever of FIG. 2.

As seen in FIG. 3, in the preferred embodiment of the present invention, the lever 5 is divided into an upper lever 5-1 and a lower lever 5-2 that are connected together with springs 11. Each of the upper and lower levers 5-1 and 5-2 is provided with a ring-pressing protuberance 5-4 and with a hinge 5-3 for preventing the tapered face of the synchronizer ring 1 from being caught or enmeshed with the tapered face of the clutch gear.

Figure 4:
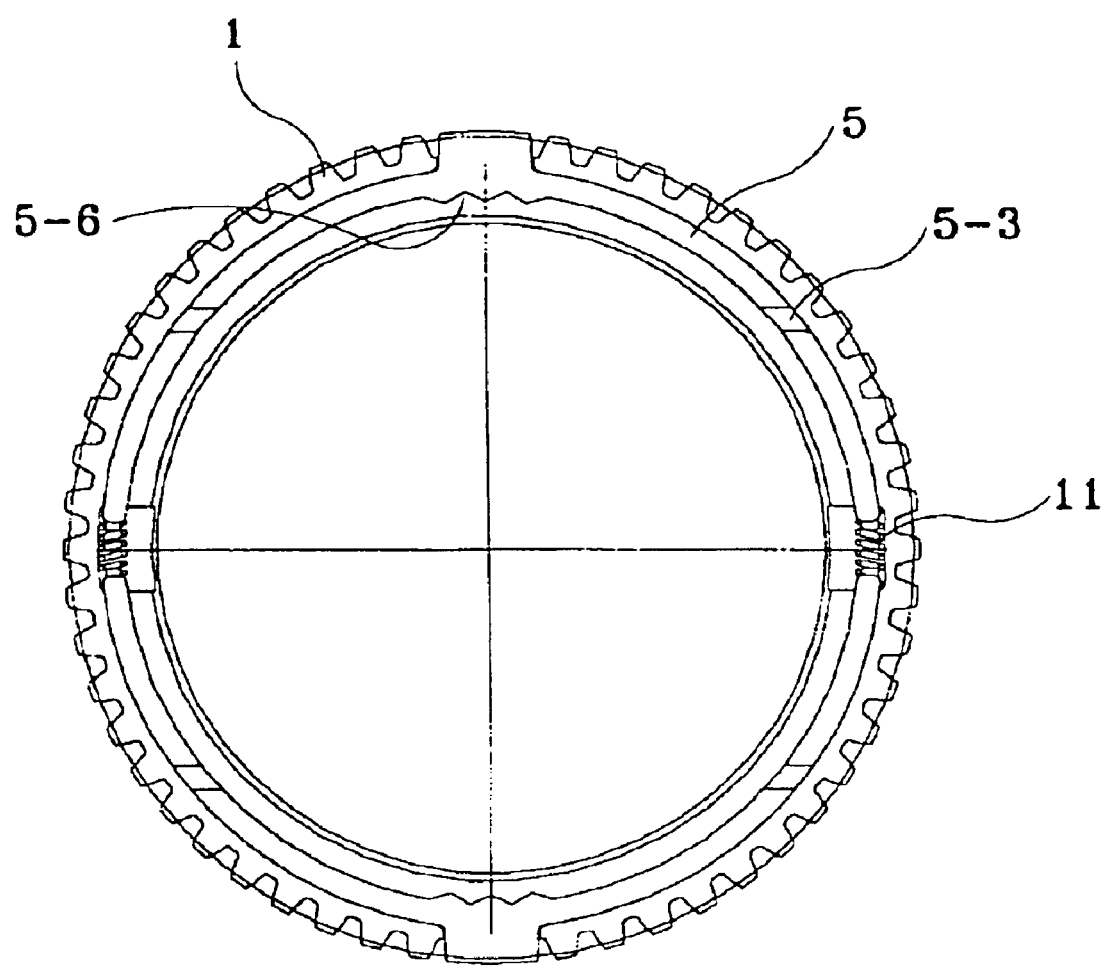
FIG. 4 illustrates an assembled state of the synchronizer ring and the lever of FIG. 2.

The upper and lower levers 5-1 and 5-2 are coupled together within the synchronizer ring 1 as shown in FIG. 4. Of course, the synchronizer ring 1 is provided with a pair of stepped faces 1-1, so that the upper and lower levers can be coupled together in the above described manner.

The sleeve 3 is provided with a pressing chamfer 3-1 inclined relative to the radial direction on the portion that interacts with the lever 5, so that the lever 5 can move in a radial inward direction. The lever 5 is provided with a passively pressed chamfer 5-5 so that the lever 5 can move in a radial inward direction, making contact with the pressing chamfer 3-1. The synchronizer ring 1 is provided with a cut part 1-2 (with its upper and lower splines removed), so that the passively pressed chamfer 5-5 can interact with the pressing chamfer 3-1 of the sleeve 3.

Figure 5:
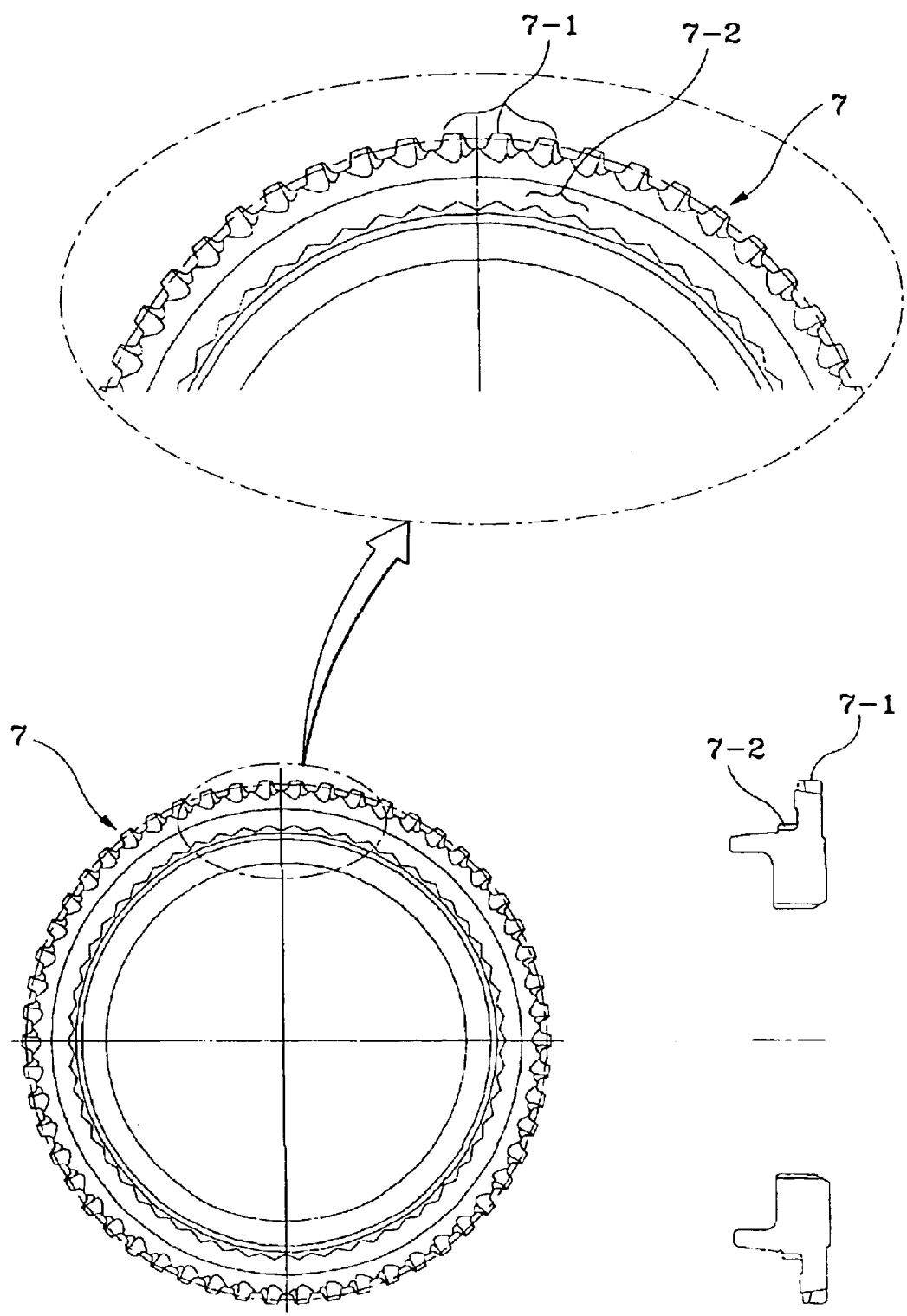
FIG. 5 illustrates a clutch gear of FIG. 2.
Figure 6:
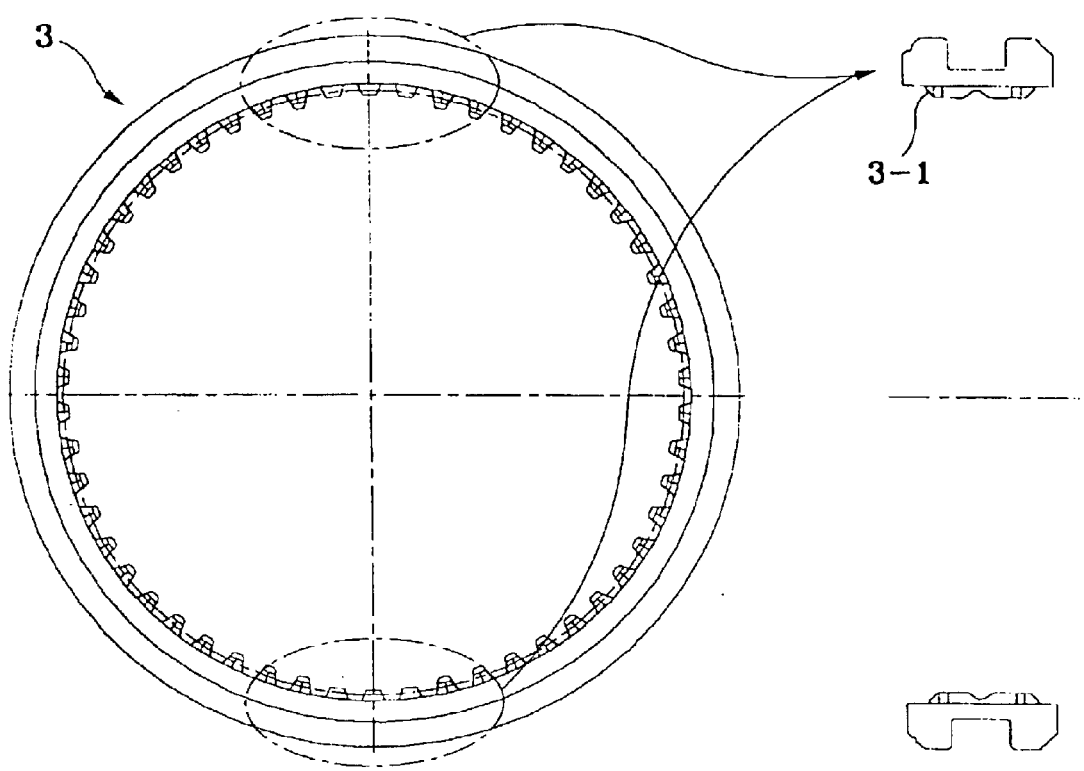
FIG. 6 illustrates a sleeve of FIG. 2.

As shown in FIG. 5, the aligning spline 9 includes: a gear side spline 7-2 having the same ripple phase as an outer spline 7-1. The spline 7-2 is positioned adjacent to the tapered face of the clutch gear 7. A lever side spline 5-6 (FIG. 4) is formed on the inside of the lever 5, so as to be meshed with the gear side spline 7-2.

Figure 7:
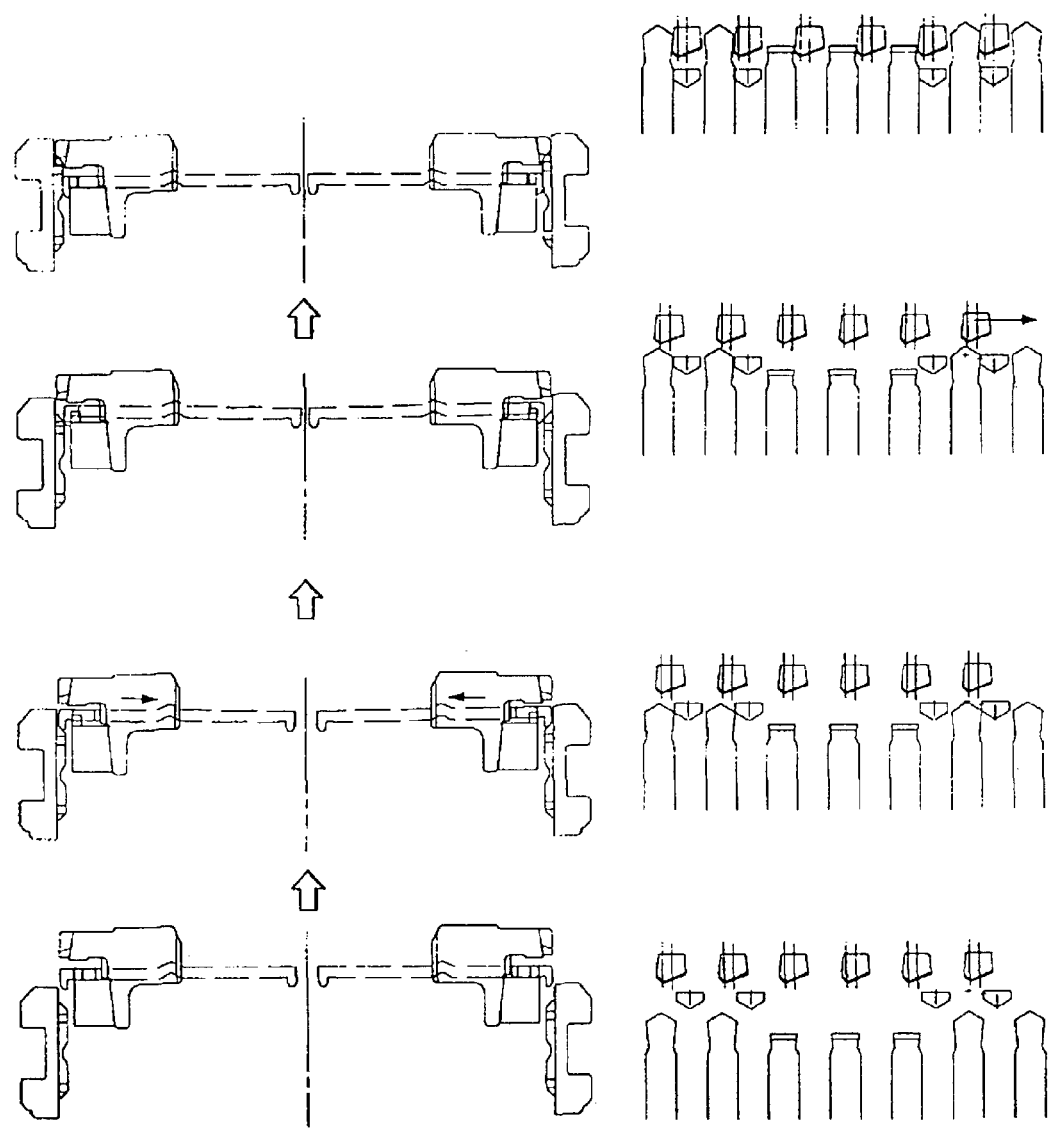
FIG. 7 illustrates actuation of the synchronizer device of FIG. 2.
Figure 8:
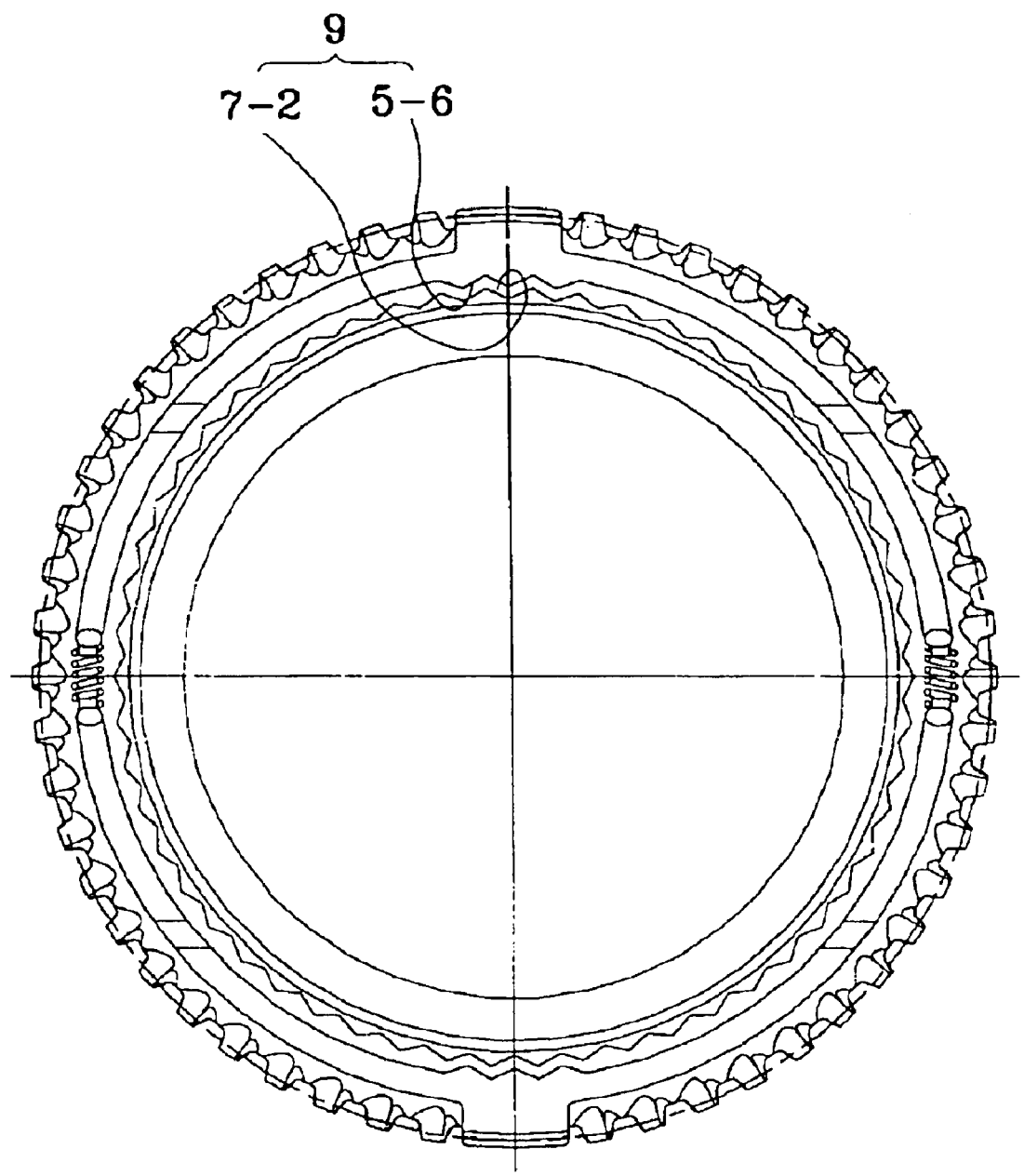
FIG. 8 illustrates a neutral status of FIG. 7.
Figure 9:
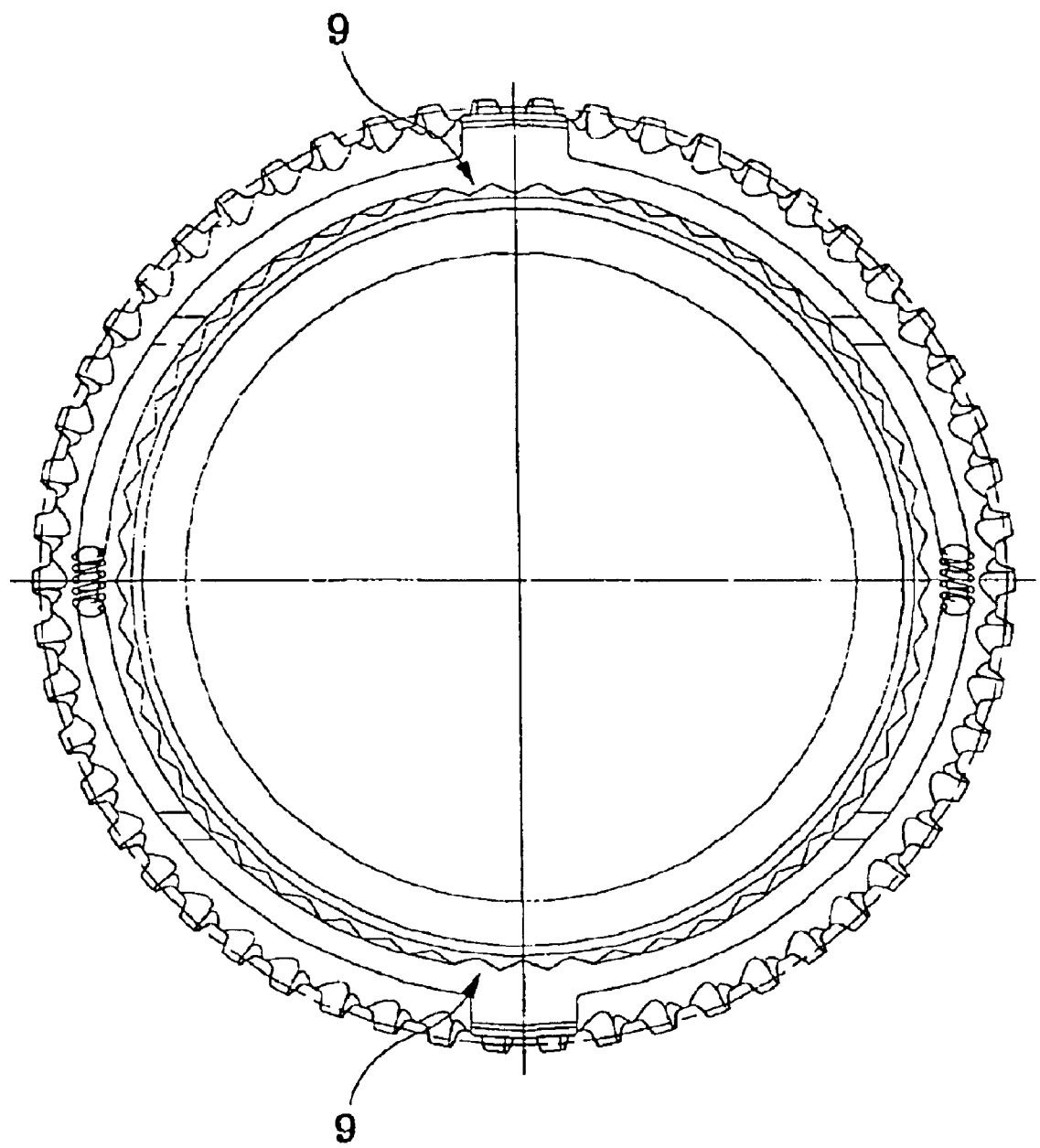
FIG. 9 illustrates a shifted status of FIG. 7.

The left part of FIG. 7 illustrates the neutral status of the synchronizer according to the present invention. The upper and lower levers 5-1 and 5-2 (FIG. 3) are biased outward by the springs 11, and, therefore, the lever side spline 5-6 (FIG. 3), which is disposed on the inside of the lever 5, is not meshed with the gear side spline 7-2 (as best seen in FIG. 8). The sleeve 3, the synchronizer ring 1, and the lever 5 revolve in a unitized manner, but the revolution torque is not transmitted to the clutch gear 7.

Returning to FIG. 7, the sleeve 3 then moves rightward, and the synchronizer ring 1 is synchronized with the clutch gear 7. This is same as the synchronization of the conventional synchronizer device, and so far, the lever 5 does not produce any action. The conventional synchronizer device undergoes a synchronization breakdown.

In the synchronizer of the present invention, the chamfer of the sleeve 3 departs from the chamfer of the synchronizer ring 1, and at the same time, the pressing chamfer 3-1 presses the passively pressed chamfer 5-5 so that the lever 5 moves in a radial inward direction while compressing the pair of springs 11. Thus, the lever side spline 5-6 which is formed on a part of the inside of the lever 5 is coupled to the gear side spline 7-2 which is formed on the clutch gear 7. In this process, the outer spline 7-1 of the clutch gear 7 is aligned with the spline of the sleeve 3. Accordingly, a complete coupling is easily formed by the movement of the sleeve 3. This is due to the fact that the ripples of the gear side spline 7-2 are positioned at the same phase as those of the outer spline 7-1 being coupled to the lever side spline 5-6, and that the ripples of the lever side spline 5-6 are properly formed relative to the synchronizer ring 1.

The ring-pressing protuberances 5-4 and the hinges 5-3 of the lever 5 induce a weak rotation of the lever 5 when the pressing chamfer 3-1 of the sleeve 3 presses the passively pressed chamfer 5-5. Accordingly, the tapered face of the synchronizer ring 1 is prevented from being caught or enmeshed with the tapered face of the clutch gear 7.

The rightmost part of FIG. 7 illustrates a state in which the sleeve 3 has completely moved to the right side to complete the coupling between the sleeve 3 and the clutch gear 7, thereby completing the shifting. In the case where the sleeve 3 moves leftward to be released from the coupling, the upper and lower levers 5-1 and 5-2 are spread outward to return to the leftmost state of FIG. 7.

According to the present invention as described above, a spline-aligned state is ensured in advance during the coupling of the sleeve to the clutch gear to prevent collision between the sleeve and the clutch gear and improve the shifting motion felt by the driver.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A synchronizer for a manual transmission, comprising:
   a lever installed on a synchronizer ring to revolve together in a unitized manner such that the lever moves in a radial direction in accordance with axial movements of a sleeve; and
   an aligning spline formed between said lever and a clutch gear so as to be coupled and decoupled in accordance with radial movements of said lever.

2. The synchronizer device as claimed in claim 1, wherein said lever is divided into two or more lever pieces, where the lever pieces are connected together with springs.

3. The synchronizer device as claimed in claim 2, wherein said lever is divided into upper and lower levers to be connected together with springs; and
   each of the upper and lower levers is provided with a hinge and a ring-pressing protuberance.

4. The synchronizer device as claimed in claim 1, wherein said sleeve is provided with a pressing chamfer inclined relative to a radial direction so as to move said lever in the radial direction; and
   said lever is provided with a passively pressed chamfer to move said lever in a radial inward direction by contacting said pressing chamfer.

5. The synchronizer device as claimed in claim 4, wherein said synchronizer ring comprises a cut part, with a part of the aligning spline removed, to form a space for interaction between said passively pressed chamfer and said pressing chamfer.

6. The synchronizer device as claimed in claim 1, wherein said aligning spline comprises:
   a gear side spline formed adjacent to a tapered face of said clutch gear, with ripples of an outer spline having an identical phase as that of ripples of said gear side spline; and
   a lever side spline fanned on a part of an inside of said lever to be meshed with said gear side spline.

7. A synchronizer for a manual transmission, comprising:
   a lever coupled to a synchronizer ring, wherein said lever and said synchronizer ring are configured to revolve together and the lever is configured to move in a radial direction based on axial motion of a sleeve; and
   an aligning spline fanned between said lever and a clutch gear, where said aligning spline detachably couples with said clutch gear based on a radial motion of said lever.

8. The synchronizer of claim 7, wherein said lever is divided into two or more lever pieces, where the layer pieces are connected together by springs.

9. The synchronizer of claim 7, wherein said lever is divided into upper and lower levers connected together by springs; and
   each of the upper and lower levers is provided with a hinge and a ring-pressing protuberance.

10. The synchronizer of claim 7, wherein said sleeve is provided with a pressing chamfer inclined relative to a radial direction so as to move said lever in the radial direction; and
    said lever is provided with a passively pressed chamfer to move said lever in a radial inward direction by contacting said pressing chamfer.

11. The synchronizer of claim 7, wherein said synchronizer ring comprises a cut part, with a part of the aligning spline removed, to form a space for interaction between said passively pressed chamfer and said pressing chamfer.

12. The synchronizer of claim 7, wherein said aligning spline comprises:
    a gear side spline formed adjacent to a tapered face of said clutch gear, with ripples of an outer spline having an identical phase as that of ripples of said gear side spline; and
    a lever side spline formed on a part of an inside of said lever to be meshed with said gear side spline.

13. A synchronizer for a manual transmission, comprising:
    a lever installed on a synchronizer ring to revolve together in a unitized manner such that the lever moves in a radial direction in accordance with axial movements of a sleeve; and
    an aligning spine formed between the lever and a clutch gear so as to be coupled and decoupled in accordance with radial movements of the lever;
    wherein the sleeve is provided with a pressing chamfer inclined relative to a radial direction so as to move the lever in the radial direction;

the lever is provided with a passively pressed chamfer to move the lever in a radial inward direction by contacting the pressing chamfer; and the synchronizer ring comprises a cut part, with a part of the aligning spine removed, to form a space for interaction between the passively pressed chamfer and the pressing chamfer.

14. A synchronizer for a manual transmission, comprising:

a lever installed on a synchronizer ring to revolve together in a unitized manner such that the lever moves in a radial direction in accordance with axial movements of a sleeve; and an aligning spine formed between the lever and a clutch gear so as to be coupled and decoupled in accordance with radial movements of the lever;

wherein the aligning spine comprises:

a gear side spline formed adjacent to a tapered face of said clutch gear, with ripples of an outer spline having an identical phase as that of ripples of the gear side spline; and a lever side spline formed on a part of an inside of the lever to be meshed with the gear side spline.

15. A synchronizer for a manual transmission, comprising:

a lever coupled to a synchronizer ring, wherein the lever and the synchronizing ring are configured to revolve together and the lever is configured to move in a radial direction based on axial motion of a sleeve; and an aligning spline formed between the lever and a clutch gear, wherein the aligning spline detachably couples with the clutch gear based on a radial motion of the lever;

wherein the synchronizer ring comprises a cut part, with a part of the spline removed, to form a space for interaction between the passively pressed chamfer and the pressing chamfer.

16. A synchronizer for a manual transmission, comprising: a lever coupled to a synchronizer ring, wherein the lever and the synchronizing ring are configured to revolve together and the lever is configured to move in a radial direction based on axial motion of a sleeve; and an aligning spline formed between the lever and a clutch gear, wherein the aligning spline detachably couples with the clutch gear based on a radial motion of the lever;

wherein the aligning spline comprises:

a gear side spline formed adjacent to a tapered face of the clutch gear, with ripples of an outer spline having an identical phase as the phase of ripples of the gear side spline; and a lever side spline formed on a part of an inside of the lever to be meshed with the gear guide spline.

* * * * *